United States Patent
Aksu et al.

(10) Patent No.: US 8,605,640 B2
(45) Date of Patent: Dec. 10, 2013

(54) NETWORK AWARE CONTENT PRE-DELIVERY OVER A RADIO ACCESS NETWORK

(75) Inventors: Arda Aksu, Martinez, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 187 days.

(21) Appl. No.: 13/116,471

(22) Filed: May 26, 2011

(65) Prior Publication Data

US 2012/0300687 A1   Nov. 29, 2012

(51) Int. Cl.
*H04H 20/71* (2008.01)
(52) U.S. Cl.
USPC .......................................... 370/312; 370/232
(58) Field of Classification Search
None
See application file for complete search history.

(56) References Cited

U.S. PATENT DOCUMENTS

| 6,591,101 | B1 * | 7/2003 | Shimbori ................ 455/435.1 |
| 2004/0229599 | A1 * | 11/2004 | Quick et al. ............. 455/414.3 |
| 2006/0068821 | A1 * | 3/2006 | Rinne ......................... 455/515 |
| 2006/0203756 | A1 * | 9/2006 | Hu ............................... 370/312 |
| 2007/0133484 | A1 * | 6/2007 | Albal et al. ................ 370/338 |
| 2011/0199900 | A1 * | 8/2011 | Ludwig et al. .......... 370/230.1 |
| 2012/0144445 | A1 * | 6/2012 | Bonta et al. ................ 725/116 |

* cited by examiner

*Primary Examiner* — Yong Zhou

(57) ABSTRACT

Efficient delivery of subscription content over a wireless network is described herein. In one implementation a device may receive load information regarding network traffic load at radio interfaces for a cellular network. The device may maintain subscription information relating to subscribers that have subscribed to receive content items and to availability of the content items. The device may determine whether a quantity of mobile devices, that are attached to the base station and are associated with subscribers that have subscribed to the first content item, is above a threshold. Finally, the device may transmit, when it is determined that the quantity of mobile devices is above the threshold, the first content item to the quantity of mobile devices as a multicast transmission over a radio interface associated with the base station.

25 Claims, 7 Drawing Sheets

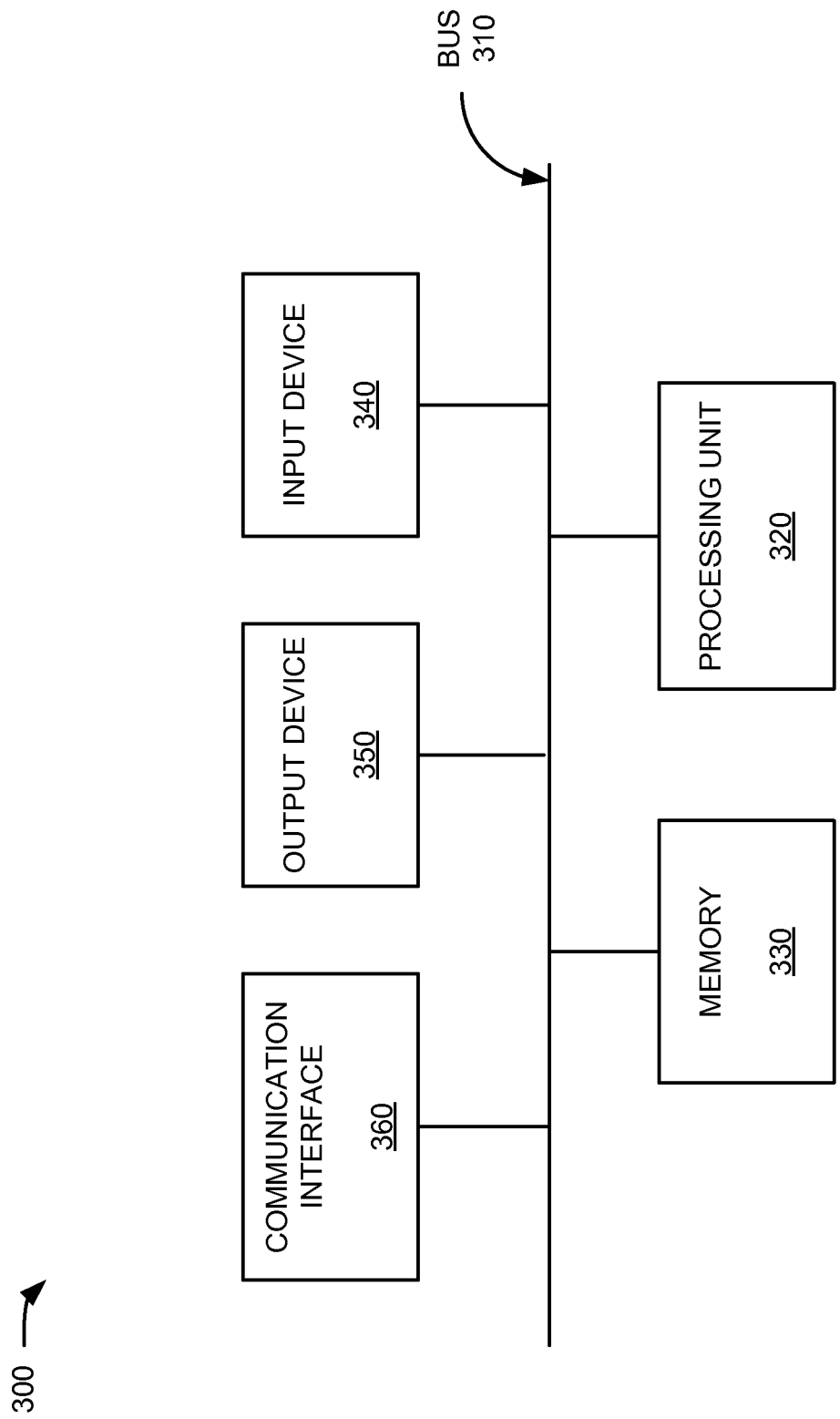

| SUBSCRIBER ID ↙510 | ATTACHED SECTOR ↙520 |
|---|---|
| SUB1 | SECTOR1 |
| SUB2 | SECTOR2 |
| SUB3 | SECTOR1 |

| SUBSCRIBER ID ↙410 | CONTENT ID ↙420 | DELIVERY STATUS ↙430 | AVAILABILITY STATUS ↙440 |
|---|---|---|---|
| SUB1 | CONTENT1 | NOT DELIVERED | YES |
|  | CONTENT2 | NOT DELIVERED | NO |
| SUB2 | SERIES1 CONTENT1 | NOT DELIVERED | YES |
|  | CONTENT3 | DELIVERED | YES |

| SECTOR ID /710 | TRAFFIC LOAD /720 |
|---|---|
| SECTOR1 | 10 |
| SECTOR2 | 50 |
| SECTOR3 | 85 |

NETWORK AWARE CONTENT PRE-DELIVERY OVER A RADIO ACCESS NETWORK

BACKGROUND

The increasing popularity of smart phones and other advanced wireless/mobile devices have enabled many applications to be wirelessly delivered. For example, social, video, music, and photo applications are commonly enjoyed by subscribers to wireless networks. These applications, however, can be relatively traffic intensive. The amount of traffic generated can potentially exhaust the network resources, particularly the radio access network, which may act as a bottleneck for the subscribers' network connections.

BRIEF DESCRIPTION OF THE DRAWINGS

FIG. 3 is a diagram of example components of a device in the environment of FIG. 1;

FIG. 4 is a diagram illustrating an example of a data structure that may be maintained by a subscriber list database shown in FIG. 2;

FIG. 5 is a diagram illustrating an example of a data structure that may be maintained by a traffic monitor shown in FIG. 2;

FIG. 7 is a diagram illustrating an example of a data structure that may be maintained by the traffic monitor shown in FIG. 2.

DETAILED DESCRIPTION OF PREFERRED EMBODIMENTS

The following detailed description refers to the accompanying drawings. The same reference numbers in different drawings may identify the same or similar elements.

Techniques described herein may relate to the delivery of traffic over wireless networks. The traffic may include subscription traffic that includes content that a user has previously requested or registered to receive. The traffic may be pre-delivered and stored by the user's mobile device. In this manner, when the user is ready to view the content, the content may be immediately available. Advantageously, the traffic may be delivered at times that minimize congestion of the radio interface of the wireless network.

Figure 1:
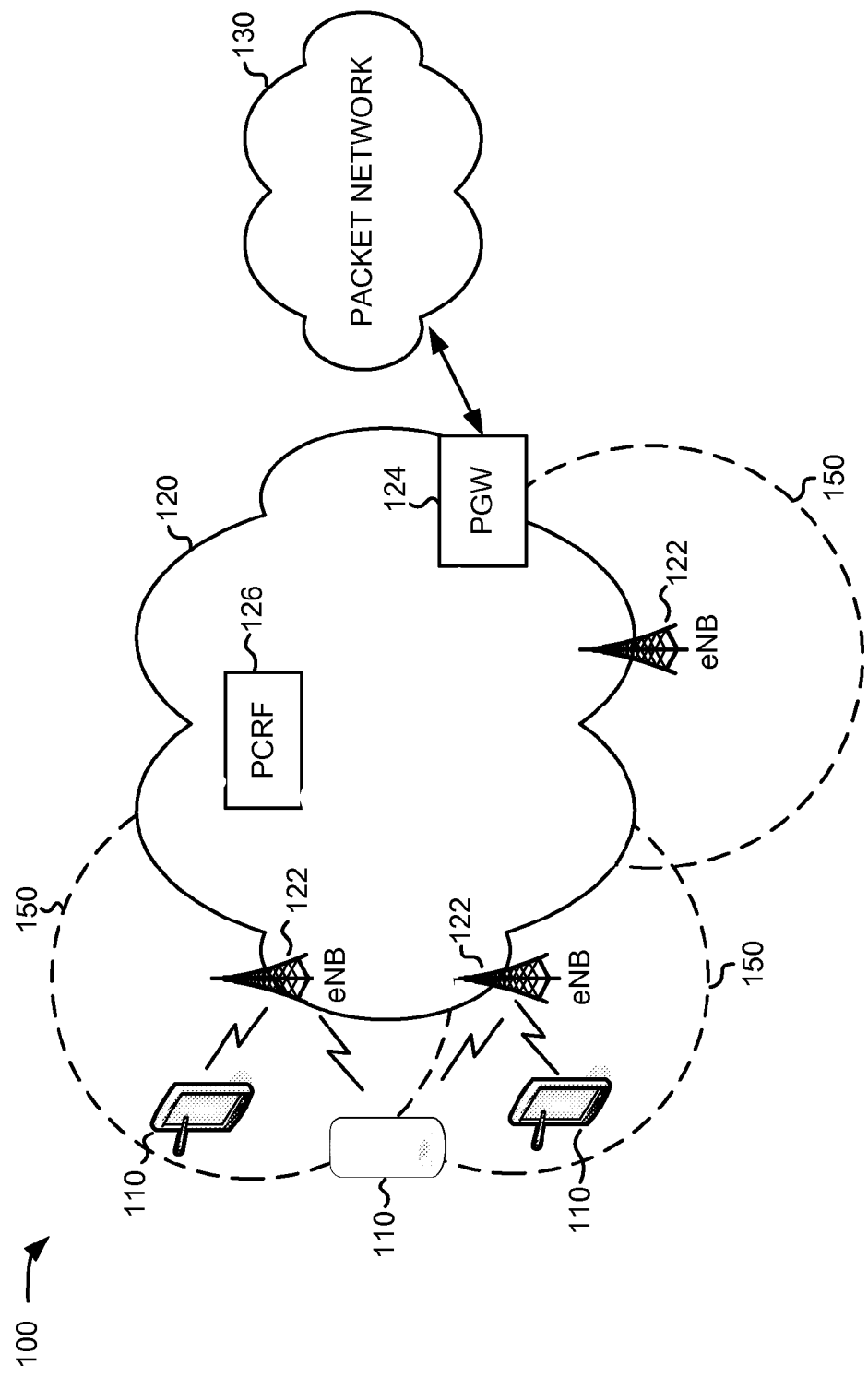
FIG. 1 is a diagram of an example environment in which systems and/or methods described herein may be implemented.

FIG. 1 is a diagram of an example environment 100 in which systems and/or methods described herein may be implemented. As illustrated, environment 100 may include mobile devices 110, a wireless network 120, and a packet network 130.

Mobile devices 110 may include portable computing and communication devices, such as a personal digital assistant (PDA), smart phone, a cellular phone, a laptop with an integrated connectivity to a cellular wireless network, etc. Mobile devices 110 may connect, through a radio link, to wireless network 120. Mobile devices 110 may obtain content from wireless network 120, store the content, and present the content to users of mobile devices 110.

Wireless network 120 may include a network that provides connectivity to mobile devices 110. Wireless network 120 may represent, for example, a cellular network operated by a cellular provider. In one implementation, wireless network 120 may include a long term evolution (LTE) network that provides wireless services to mobile devices 110. In another implementation, cellular networks other than an LTE network may be used. Wireless network 120 may particularly include base stations ("eNBs") 122, a packet data network gateway (PGW) 124, and a policy charging and rules function (PCRF) server 126. Although referred to as a "wireless" network, the wireless portion of wireless network 120 may particularly refer to the radio interface between mobile devices 110 and base station 122. Connections between network devices (e.g., base stations 122, PGW 124, and PCFR server 126) within wireless network 120 may include wired and/or wireless connections. In general, a number of other networks devices, which are not shown herein for clarity, may also be used in the implementation of wireless network 120.

Base stations 122 may provide the radio interface to transmit and receive data with mobile devices 110. In one implementation, base stations 122 may utilize LTE standards operating in a 700 MHz frequency band (i.e., base stations 122 may each be a base station in a LTE network).

Each base station 122 may be associated with one or more geographical service areas surrounding the base station. The service areas may be referred to as wireless "cells" or "sectors" that are defined by the radio range of a base station 122. A single sector, corresponding to each of base stations 122, is shown as sector 150 in FIG. 1. In an alternative possible implementation, one base station 122 may be associated with multiple sectors.

PGW 124 may provide connectivity to external networks, such as packet network 130. A mobile device 110 may have simultaneous connectivity with more than one PGW to multiple additional networks. PGW 124 may perform, for example, policy enforcement, packet filtering for each user, charging support, lawful interception, and/or packet screening.

PCRF server 126 may access subscriber databases and other resources to make policy decisions relating to subscribers (i.e., users of mobile devices 110). The policy decisions may relate to, for example, quality of service (QoS) decisions and charging rules.

Packet network 130 may include a public or private (or both) packet-based network. One or more servers may be connected to or located within packet network 130. The servers may provide, for example, pre-delivery of content, to mobile devices 110, over wireless network 120.

In implementations described herein, content, such as video content, audio content, or other content, may be pre-delivered to mobile devices 110 using techniques that reduce congestion of the radio interfaces of wireless network 120. The pre-delivered content may include subscription content. Subscription content may broadly refer to any content that a user schedules or requests ahead of the intended viewing time of the content. For example, popular television shows, audio shows, or other content, may be subscribed to by multiple users of mobile devices 110. The content for a particular subscription may become available to a number of users at a particular time, such as the time at which the content is "released" by the content provider.

Figure 2:
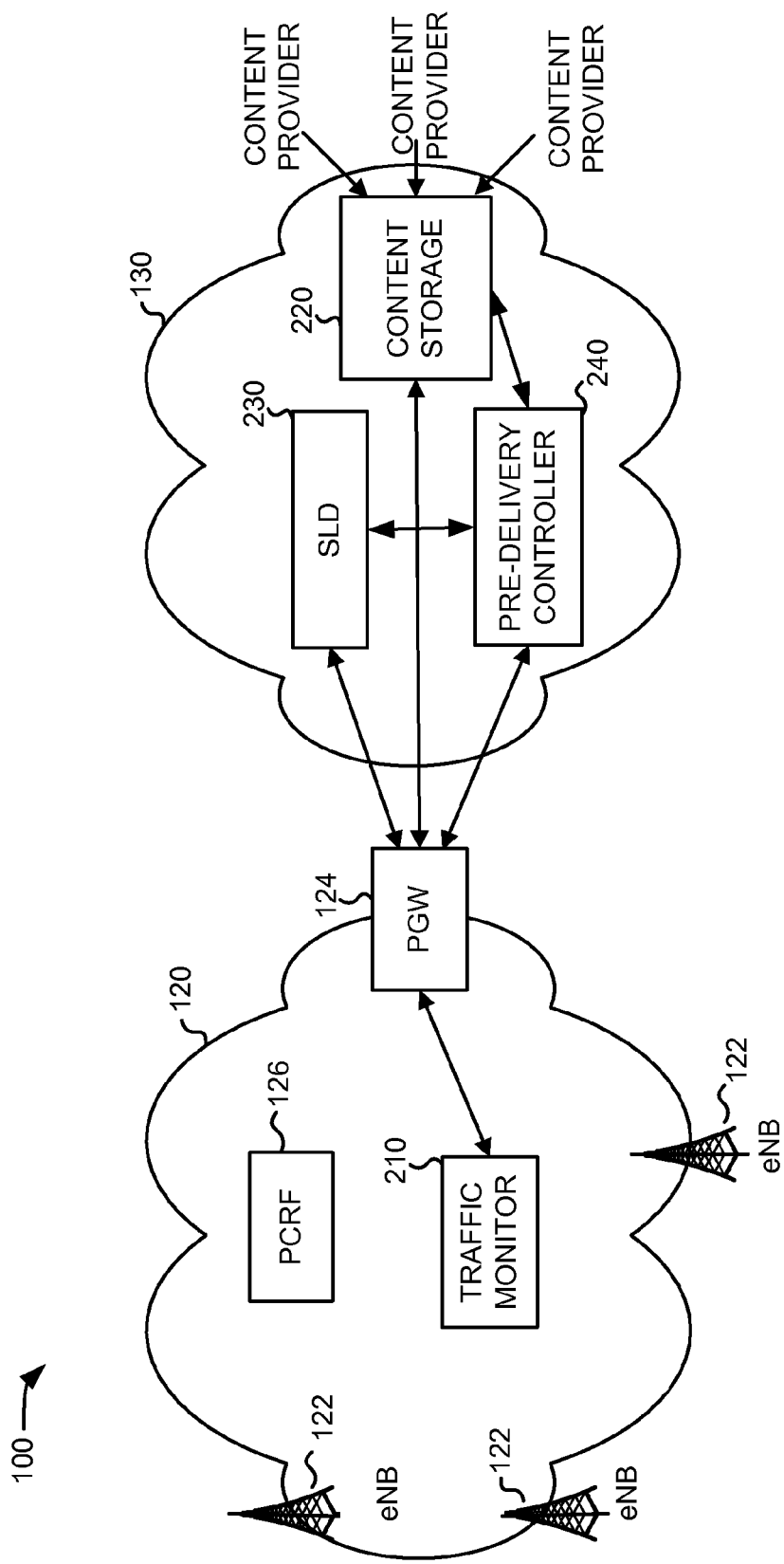
FIG. 2 is a diagram illustrating an example of additional components in environment of FIG. 1.

FIG. 2 is a diagram illustrating an example of additional components, which may be related to the pre-delivery of content to mobile devices 110, in environment 100. The additional components may include a traffic monitor 210, content storage 220, a subscriber list database (SLD) 230, and a pre-delivery controller 240.

Traffic monitor 210 may include one or more devices that monitor traffic at base stations 122. In one implementation, traffic monitor 210 may keep track of the radio interfaces of base stations 122. For example, traffic monitor 210 may track the number of connected users to a base station 122, the bandwidth being used by a base station 122, the amount of guaranteed bit rate (GBR) traffic being used by each base station 122, and/or some other metric relating to a current congestion or load level at a base station 122. Traffic monitor 210 may receive information relating to the load/congestion of a sector from base stations 122 and/or from PGW 124. In some implementations, the functions of traffic monitor 210 may be implemented by or within PCRF server 126.

Content storage 220 may include one or more storage devices, such as a database or other storage device, to store content that is to be pre-delivered to mobile devices 110. The content may be provided to content storage 220 by one or more content providers. As previously mentioned, the pre-delivered content may include subscription content, such as serial television shows, audio shows, etc. The content providers may thus, for example, correspond to providers of subscription content.

SLD 230 may include logic to keep track of users of mobile devices 110 that have subscribed to receive content. The users may subscribe to content, such as through a web interface, through an application running on a mobile device 110, or through another interface. SLD 230 may keep track of which users have subscribed to which content. As an example, assume a particular user enjoys a serial audio show (e.g., a "podcast") in which new episodes are first published on Wednesdays. The user may subscribe to the audio show and a record of the user's subscription may be stored in SLD 230.

Pre-delivery controller 240 may include logic to control the pre-delivery of content, from content storage 220, to mobile devices 110. By pre-delivering content, the content may be available on mobile devices 110 when desired by the users, potentially without latency or quality of services issues that may be associated with the streaming of content as it is being viewed. Pre-delivery controller 240 may receive traffic congestion information, relating to base stations 122, from traffic monitor 210. Based on the congestion information and/or based on information from SLD 230, pre-deliver controller 240 may control the pre-delivery of content to mobile devices 110. The operation of pre-delivery controller 240 in conjunction with traffic monitor 210, content storage 220, and SLD 230 will be described in more detail below.

Although FIGS. 1 and 2 illustrate example components of environment 100, in other implementations, environment 100 may include additional components, fewer components, different components, or differently arranged components than those illustrated in FIG. 1 and described herein. Alternatively, or additionally, one or more components of environment 100 may perform one or more tasks described as being performed by one or more other components of the portion of environment 100. For example, although traffic monitor 210 is shown within wireless network 120 and content storage 220, SLD 230, and pre-delivery controller 240 are shown within packet network 130, in alternative implementations, each of these components may be implemented within wireless network 120, packet network 130, or within another network.

FIG. 3 is a diagram of example components of a device 300 that may correspond to one of the components shown in environment 100, such as mobile device 110, base station 122, PGW 124, PCRF server 126, traffic monitor 210, content storage 220, SLD 230, and/or pre-delivery controller 240. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. Additionally or alternatively, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more tasks described as being performed by one or more other components of device 300.

FIG. 4 is a diagram illustrating an example of a data structure 400 that may be maintained by SLD 230. Data structure 400 may generally relate the users of mobile devices 110 ("subscribers") to content to which the subscribers have subscribed and the pre-delivery status of the content. As shown, data structure 400 may include a subscriber identification (ID) field 410, a content ID field 420, a delivery status field 430, and an availability status field 440.

Subscriber ID field 410 may store information that identifies a particular subscriber. Subscriber ID field 410 may include, for example, a subscriber account name that was created by the subscriber, a value associated with the mobile device 110 of the subscriber (e.g., the International Mobile Equipment Identity (IMEI) of the subscriber's mobile device 110), or another subscriber identifier. In FIG. 4, the example subscriber identifiers "sub1" and "sub2" are illustrated.

Content ID field 420 may list the content items for which a particular subscriber has subscribed. The content items may be identified using a number of possible techniques. For example, each unique episode of a subscribed-to-series may be included in content ID field 420. New episodes may be added to content ID field as the new episodes become available. As another example, content ID field 420 may include information identifying the particular series for which the content items are issued. For example, the series titled "Weekly Tech Talk With Steve" may be included in content ID field 420. As new content becomes available for this series, it may be added to content ID field 420. The example content labels: "CONTENT1," "CONTENT2," "SERIES1," and "CONTENT3" are particularly illustrated in FIG. 4. In general, the content items included in content ID field 420 may include any recurring content, such as a series of television shows, radio or other audio shows, etc.

Delivery status field 430 may include a value indicating whether a particular content item has already been delivered to the corresponding subscriber. Delivery status field 430 may store, for example, a boolean or other value. Availability status field 440 may store a value indicating whether a particular content item is available to be delivered. For example, content that is stored in content storage 220 and is eligible for delivery to mobile devices 110 may include a value, such as a boolean value, indicating that the content can be delivered. In some situations, content may be available in content storage 220 but may not yet be eligible for delivery. For instance, a content provider may provide a copy of a content item to content storage 220 a certain period before the official release date of the content item. In this situation, availability status field 440 may, for example, include the value "No" when the content item is received and be changed to "Yes" at the release date of the content item.

The fields shown for data structure 400 are examples of possible fields that may be maintained by SLD 230. In alternative implementations, different fields, additional fields, or fewer fields may be used in data structure 400.

In one implementation, the content items associated with data structure 400 may be limited to the most popular content items that are subscribed to by subscribers. Tracking only the most popular content items in data structure 400 may be particularly applicable when using multicast pre-delivery.

In one implementation, pre-delivery of content to subscribers may be performed using multicast delivery techniques over the radio interfaces of base stations 122. Multicast pre-delivery will next be particularly discussed with reference to FIGS. 5 and 6.

FIG. 5 is a diagram illustrating an example of a data structure 500 that may be maintained by traffic monitor 210. In general, data structure 500 may be used to keep track of the sectors and/or base station to which a subscriber is currently attached. Data structure 500 may include a subscriber ID field 510 and an attached sector field 520.

Subscriber ID field 510 may be similar to subscriber ID field 410 and may store information that identifies a particular subscriber. Subscriber ID field 510 may include, for example, a subscriber account name that was created by the subscriber, a value associated with the mobile device 110 of the subscriber (e.g., the IMEI of the subscriber's mobile device 110), or another subscriber identifier.

Attached sector filed 520 may store the sector to which the indicated subscriber is currently attached. An "attached" subscriber may correspond to a mobile device 110 that is powered-on and is able to receive data from its base station 122. Traffic monitor 210 may obtain the sector corresponding to attached subscribers from, for example, base station 122 or PGW 124.

In data structure 500, the subscriber identifiers in subscriber ID field 510 may be unique while the sectors listed in attached sector field 520 may be duplicated. As shown in the example of FIG. 5, the subscribers labeled "SUB1" and "SUB3" correspond to the base station associated with "SECTOR1."

The fields shown for data structure 500 are examples of possible fields that may be maintained by traffic monitor 210. In alternative implementations, different fields, additional fields, or fewer fields may be used in data structure 500.

Figure 6:
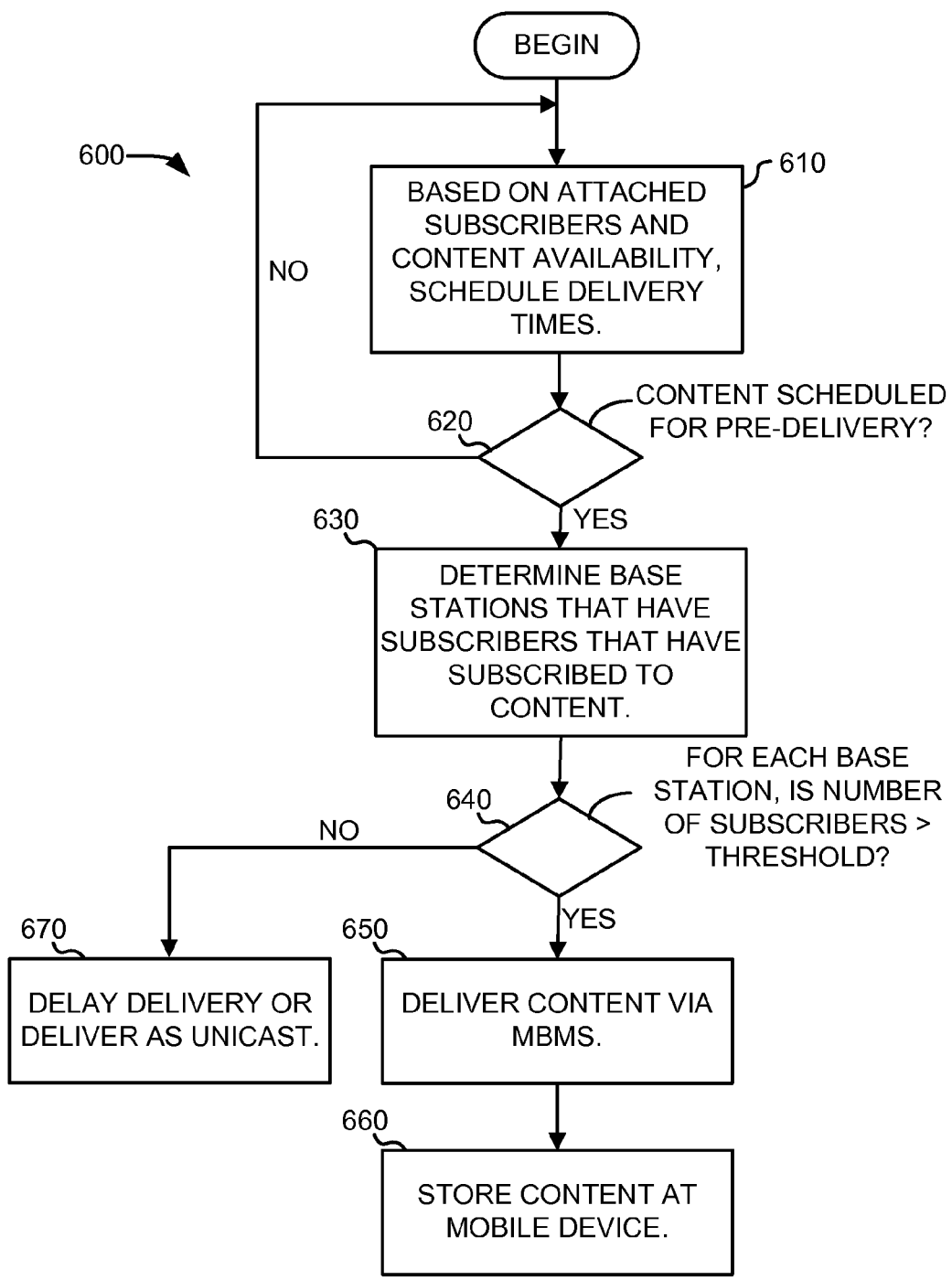
FIG. 6 is a flow chart illustrating an example process for pre-delivering content through a wireless network.

FIG. 6 is a flow chart illustrating an example process 600 for pre-delivering content through wireless network 120. Process 600 may be performed by, for example, one or more of traffic monitor 210, content storage 220, SLD 230, and pre-delivery controller 240. Process 600 may be repeated periodically or may be continuously performed in a repeating loop. Alternatively, process 600 may be performed whenever a new content item is received from the content providers.

Process 600 may include scheduling, based on the attached subscribers and based on content availability, delivery times for the available content (block 610). Pre-delivery controller 240 may, for example, obtain information relating to attached subscribers from traffic monitor 210 (e.g., data structure 500) and obtain information relating to available content from SLD 230 (e.g., data structure 400). Based on this information, pre-delivery controller 240 may determine which undelivered content items in data structure 400 are available to be delivered and are requested by at least one currently attached subscriber. For example, pre-delivery controller 240 may schedule content to be immediately delivered anytime content that is available for delivery is requested by a certain minimum number of subscribers.

Process 600 may further include determining whether it is time to deliver content that is scheduled for pre-delivery (block 620). For example, content that is released at noon on a certain date may be scheduled for pre-delivery at noon or shortly after noon.

When content is scheduled for pre-delivery (block 620—YES), process 600 may further include determining the base stations with subscribers that have subscribed to the content (block 630). Pre-delivery controller 240 may, for instance, based on data structure 500, determine the set of base stations 122 for which attached subscribers are requesting the content.

Although blocks 610, 620, and 630 are illustrated in FIG. 6 as three separate blocks, the operations of these blocks may be performed in a single operation in which pre-delivery controller 240 may examine data structures 400 and 500 to determine the set of base stations 122 that include attached subscribers that have requested a particular content item.

For each of the set of base stations determined in block 630, process 600 may include determining whether the number of attached subscribers for the particular content item is greater than a threshold (block 640). The threshold may be used to determine whether multicasting the content item is an efficient operation. In one implementation, the threshold may be 1, in which case, the content may be delivered via multicast whenever more than one subscriber (who requested the content item) is attached to the base station. In alternative implementations, the threshold may be a higher number. It may be desired to set the threshold to a higher number so that content pre-delivery may only be preformed when multicast pre-delivery is "highly" efficient.

When the number of attached subscribers is lower or equal to the threshold, (block 640—NO), the pre-delivery of the content may be delayed or delivered as unicast data (block 670). For example, if only one subscriber to a certain content item is attached to a base station 122, pre-delivery controller 240 may refrain from pre-delivering the content. Instead, the content may be pre-delivered at a later time when more subscribers are attached to the base station. In this way, the resources of wireless network 120 may be more efficiently used. Alternatively, the content may be pre-delivered to the user via a unicast connection or the content may not be pre-delivered to the subscriber and may instead be delivered to the subscriber as on-demand streaming content when the subscriber chooses to view the content.

When the number of attached subscribers is greater than the threshold, (block 640—YES), the content may be delivered to each of the subscribers via a multicast technique, such as multicast broadcast media services (MBMS) (block 650). In MBMS, the mobile devices of each of the multiple subscribers, which are attached to a base station 122, may be instructed to receive data over a particular (identical) channel. From the perspective of base station 122, only a single signal may need to be broadcast to implement the multicast. Each of the multiple subscribers may, however, receive the signal. In this manner, efficient use of the air interface of base station 122 may be affected, as a single channel may be used to send content to a number of subscribers.

Process 600 may further include storing the multicast content at each of mobile devices 110 of the subscribers (block 660). The content may thus be downloaded to the subscribers' mobile devices and may be ready to be viewed, either on or offline, when desired by a subscriber. By pre-storing the subscribed-to content items at mobile devices 110, at times that are optimized for MBMS, the radio interfaces of wireless network 120 may be efficiently used.

In another implementation described herein, pre-delivery of content items to subscribers may be performed at times in which the network load of the air interfaces of wireless network 120 is low. This implementation will next be described with reference to FIGS. 7 and 8.

FIG. 7 is a diagram illustrating an example of a data structure 700 that may be maintained by traffic monitor 210. In general, data structure 700 may be used to keep track of the load associated with sectors and/or base stations in wireless network 120. Data structure 700 may include sector ID field 710 and traffic load field 720.

Sector ID field 510 may store identifiers for the sectors/base stations in wireless network 120. Three example sectors are illustrated in FIG. 7, the sectors labeled "SECTOR1," "SECTOR2," and "SECTOR3," which may correspond to base stations 122 in wireless network 120.

Traffic load field 720 may store an indication of the current load of the corresponding base station or sector. In one implementation, the indication of the current load may be a measurement or estimate of the total guaranteed bit rate (GBR) traffic of the air interface(s) of the corresponding base station/sector. The GBR traffic for a base station or sector may refer to the traffic that the base station has guaranteed, such as via pre-determined traffic or service level contracts, to deliver. The value in traffic load field 720 may be expressed as, for example, an average GBR traffic rate over a previous time period (e.g., a minute), a percentage indicating a previous average GBR traffic rate relative to a maximum traffic capacity of the base station/sector, or as another metric. In the example of FIG. 7, the values in traffic load field 720 may be illustrated as a percentage of the current GBR traffic of a base station relative to the maximum GBR traffic. Thus, for instance, the load of "SECTOR1" is 10%, the load of "SECTOR2" is "50%", and the load of "SECTOR3" is 85%.

Traffic monitor 210 may maintain traffic load field 720 using a number of possible techniques. For example, traffic monitor 210 may query base stations 122, PGW 124, or other network devices to obtain statistics relating to network load.

The fields shown for data structure 700 are examples of possible fields that may be maintained by traffic monitor 210. In alternative implementations, different fields, additional fields, or fewer fields may be used in data structure 700.

Figure 8:
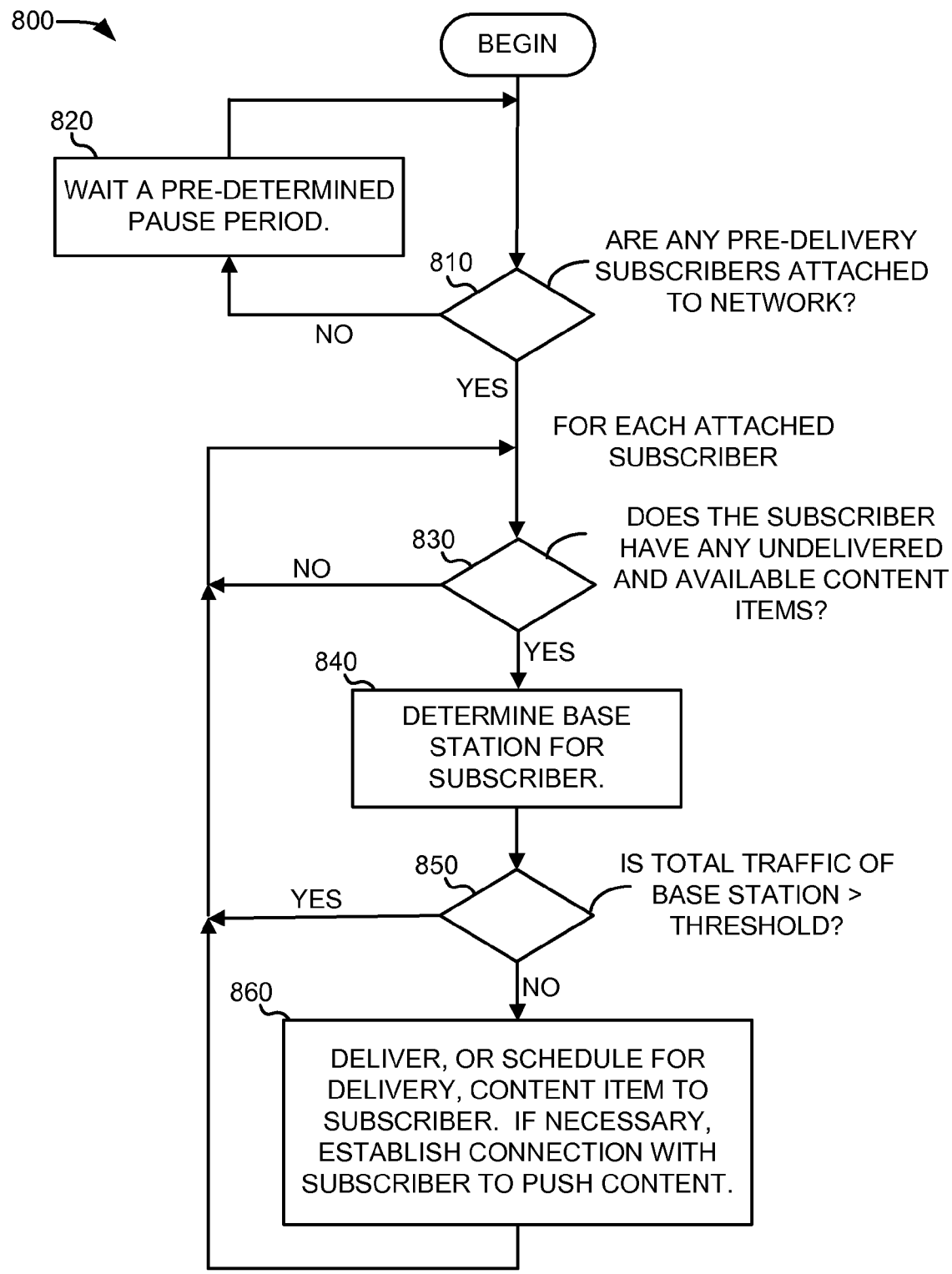
FIG. 8 is a flow chart illustrating an example process for pre-delivering content through a wireless network.

FIG. 8 is a flow chart illustrating an example process 800 for pre-delivering content through wireless network 120. Process 800 may be performed by, for example, one or more of traffic monitor 210, content storage 220, SLD 230, and pre-delivery controller 240.

Process 800 may include determining whether any subscribers, which have subscribed to subscription content (i.e., a pre-delivery subscriber), are attached to wireless network 120 (block 810). As previously mentioned, an attached mobile device may correspond to a mobile device 110 that is powered-on and is able to receive data from its base station 122. In one implementation, pre-delivery controller 240 may examine data structure 500 to determine whether any subscribers are attached to wireless network 120.

When no subscribers are attached, (block 810—NO), process 800 may further include pausing before re-performing block 810 (block 820). For example, a pre-determined period, such as a minute, may be allowed to elapse before again determining whether subscribers are attached to wireless network 120.

If at least one subscriber is determined, in block 810, to be attached to wireless network 120, blocks 830 through 860 may be repeated for each attached subscriber (block 810—YES).

Process 800 may further include determining whether the subscriber has any undelivered content items that are also available for downloading (block 830). In one implementation, pre-delivery controller 240 may examine data structure 400, from SLD 230, to determine whether the subscriber has any undelivered content items that are also available for downloading. If there are content items available for the subscriber, (block 830—YES), pre-delivery controller 240 may determine the base station for the subscriber (i.e., base station 122 to which the subscriber is attached) (block 840). The base station may be determined, for example, from data structure 500.

Process 800 may further include determining whether the total traffic of the base station (i.e., the base station 122 determined in block 840) is greater than a threshold (block 850). The threshold may be pre-determined by, for example, an administrator. Alternatively, the threshold may be determined in another way, such as via a historical analysis of traffic in wireless network 120 or a historical analysis of traffic load at the particular base station. The total traffic for the base station may be looked up by pre-delivery controller 240 in data structure 700. As an example of the application of block 850, assume that the determined base station is labeled "SECTOR1" and the threshold is set by an administrator as 60% of the current GBR traffic of a base station relative to the maximum GBR of the base station. In this example, block 850 may proceed to block 860 (block 850—NO), if the value, as looked-up in traffic load field 720 of data structure 700, is less than 60% (i.e., the traffic load at SECTOR1 is determined to be light, as defined by the threshold comparison).

Process 800 may further include, when the result of block 850 is NO, delivering the content item to the subscriber (block 860). In an alternative implementation, instead of delivering the content item, the content item may be scheduled or queued for later deliver (block 860). In either case, the delivery of the content item may include pre-storing the content item at mobile device 110 of the subscriber. The content may thus be downloaded to the subscribers' mobile devices and may be ready to be viewed, either on or offline, when desired by the subscriber. In some situations, before downloading the content item to mobile device 110 of the subscriber, the pre-delivery controller 240 may establish a "push" connection with mobile device 110 through which the content item can be delivered, in the background, to mobile device 110 (block 860).

In one implementation, the delivery of the content in block 860 may be performed using a unicast connection in which the content item is pushed to the subscriber on a per-subscriber basis. Alternatively, subscribers that are scheduled for delivery (e.g., as scheduled in block 860) may be aggregated so that, if multiple subscribers are scheduled to receive the same content item and are attached to a common base station, a multicast technique may be used to deliver the content item over the radio interface.

Referring back to block 830, when the subscriber does not have any undelivered content, (block 830—NO), block 830 may be performed for the next attached subscriber. Similarly, if the total traffic of a base station 122 is greater than the threshold, (block 850—YES), or after the content item is delivered or scheduled for delivery (block 860), block 830 may be performed for the next attached subscriber.

Advantageously, with process 800, content may be pre-delivered to subscribers of a wireless network in a way that ensures that the pre-delivery of the content does not overburden the radio interface(s) of the wireless network.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more devices, the method comprising:
    maintaining, by the one or more devices, subscription information relating to:
        subscribers that have subscribed to receive a series of content items that are made available on a recurring basis, and
        an availability of the series of content items;
    determining, by the one or more devices, whether the subscription information indicates that a next content item, in the series of content items, is available;
    determining, by the one or more devices and when the next content item is determined to be available, whether a base station in a cellular network has attached mobile devices, associated with subscribers, that have subscribed to the next content item;
    determining, by the one or more devices, whether a quantity of mobile devices, that are attached to the base station and that are associated with the subscribers that have subscribed to the next content item, is above a threshold;
    transmitting, when it is determined that the quantity of mobile devices is above the threshold, the next content item to the quantity of mobile devices as a multicast transmission over a radio interface associated with the base station; and
    delaying, by the one or more devices, an initiation of transmission of the next content item, to the mobile devices, when it is determined that the quantity of subscribers is not above the threshold.

2. The method of claim 1, where the series of content items includes a series of video or audio content items.

3. The method of claim 1, where the series of content items includes a television series.

4. The method of claim 1, where the threshold is greater than one.

5. The method of claim 1, where the cellular network includes a long term evolution (LTE) wireless network.

6. The method of claim 1, wherein transmitting the next content item to the subscriber further includes:
    pre-delivering the next content item to the subscriber for later viewing by the subscriber.

7. A method implemented by one or more devices, the method comprising:
    receiving, by the one or more devices, load information regarding network traffic load at radio interfaces for a cellular network;
    maintaining, by the one or more devices, subscription information that relates to:
        subscribers that have subscribed to receive a series of content items that are made available on a recurring basis, and
        an availability of the series of content items;
    determining, by the one or more devices, whether the subscription information indicates that a next content item, in the series of content items, is available;
    determining, by the one or more devices and when the next content item is determined to be available, whether a subscriber is attached to a base station in the wireless network and is associated with the next content item;

determining, by the one or more devices and based on the load information, whether a traffic load for a radio interface of the base station is greater than a threshold; and transmitting, by the one or more devices and when it is determined that the traffic load for the radio interface of the base station is not greater than the threshold, the next content item to the subscriber for storage of the next content item by a mobile device of the subscriber.

8. The method of claim 7, where the load information includes information defining an amount of guaranteed bit rate (GBR) traffic that is being used by the base station.

9. The method of claim 8, where the threshold defines a maximum portion of the GBR traffic that is being used by the base station.

10. The method of claim 7, further comprising:
repeating, when no subscriber is attached to a base station, the determination of whether the subscriber is attached to the base station, the repeating occurring after:
determining that a pre-determined time period has elapsed.

11. The method of claim 7, where the series of content items includes a series of video or audio content items.

12. The method of claim 7, where the series of content items includes a television series.

13. The method of claim 7, wherein the load information includes information regarding a congestion level of network traffic at the radio interfaces for the cellular network.

14. A system comprising:
a subscriber database to store subscription information relating to:
subscribers that have subscribed to receive a series of content items that are made available on a recurring basis and,
an availability of the series of content items; and
a pre-delivery controller, operatively coupled to the traffic monitor and the subscriber database, the pre-delivery controller to:
determine whether the subscription information indicates that a next content item, in the series of content items, is available;
determine, when the next content item is determined to be available, whether a base station in a cellular network has attached mobile devices, associated with subscribers, that have subscribed to the next content item,
determine whether a quantity of mobile devices, that are attached to the base station and that are associated with the subscribers that have subscribed to the next content item, is above a threshold,
initiate transmission, when it is determined that the quantity of mobile devices is above the threshold, of the next content item to the quantity of mobile devices as a multicast transmission over a radio interface associated with the base station; and
delay an initiation of transmission of the next content item, to the mobile devices, when it is determined that the quantity of subscribers is not above the threshold.

15. The system of claim 14, further comprising:
a content storage component to:
receive the content items from content providers; and
store the received content items.

16. The system of claim 14, where the series of content items includes a series of video or audio content items.

17. The system of claim 14, where the series of content items includes a television series.

18. The system of claim 14, wherein the pre-delivery controller, when initiating transmission of the next content item, is further to:
pre-deliver the next content item to the quantity of mobile devices for later viewing by the quantity of mobile devices.

19. A device comprising:
one or more processors; and
one or more memories, coupled to the one or more processors, the one or more memories storing instructions, that when executed by the one or more processors, cause the one or more processors to:
receive load information regarding network traffic load at radio interfaces for a cellular network,
maintain subscription information that relates to:
subscribers that have subscribed to receive a series of content items that are made available on a recurring basis, and
availability of the series of content items,
determine whether the subscription information indicates that a next content item, in the series of content items, is available;
determine, when the next content item is determined to be available, whether a subscriber is attached to a base station in the cellular network and is associated with the next content item,
determine, based on the load information, whether a traffic load for a radio interface of the base station is greater than a threshold, and
control, when it is determined that the traffic load for the radio interface of the base station is not greater than the threshold, a transmission of the next content item to the subscriber for storage of the next content item by a mobile device of the subscriber.

20. The device of claim 19, where the load information includes information defining an amount of guaranteed bit rate (GBR) traffic that is being used by the base station.

21. The device of claim 20, where the threshold defines a maximum portion of the GBR traffic that is being used by the base station.

22. The device of claim 19, where the series of content items includes a series of video or audio content items.

23. The device of claim 19, where the series of content items includes a television series.

24. The device of claim 19, where the cellular network includes a long term evolution (LTE) network.

25. The device of claim 19, wherein the load information includes information regarding a congestion level of network traffic at the radio interfaces for the cellular network.

* * * * *